United States Patent [19]
Nishio

[11] Patent Number: 6,049,678
[45] Date of Patent: *Apr. 11, 2000

[54] CAMERA PREVENTING FILM MOVEMENT IN STOPPED STATE

[75] Inventor: Tetsuya Nishio, Kanagawa-ken, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,888

[22] Filed: May 29, 1996

[51] Int. Cl.[7] .................................................. G03B 1/00
[52] U.S. Cl. ...................... 396/395; 396/399; 396/418; 396/320
[58] Field of Search ............................. 354/75, 76, 105, 354/106, 203, 212–216; 396/319, 320, 387, 395, 396, 397, 399, 411, 418

[56] References Cited

U.S. PATENT DOCUMENTS

| | | | |
|---|---|---|---|
| 3,675,555 | 7/1972 | Mori | 95/31 FM |
| 3,774,513 | 11/1973 | Ettischer et al. | 95/31 FM |
| 4,174,168 | 11/1979 | Yamashita | 354/206 |
| 4,211,479 | 7/1980 | Zawodny | 354/213 |
| 4,600,286 | 7/1986 | Harvey | 354/212 |
| 4,914,462 | 4/1990 | Pagano | 354/213 |
| 5,023,640 | 6/1991 | Diehl | 354/173.1 |
| 5,410,380 | 4/1995 | Kawamura et al. | 354/213 |
| 5,543,871 | 8/1996 | Shimizu | 354/106 |
| 5,614,975 | 3/1997 | SanGregory et al. | 396/396 |

FOREIGN PATENT DOCUMENTS

| | | |
|---|---|---|
| 0363849 | 4/1990 | European Pat. Off. . |
| 0435277 | 7/1991 | European Pat. Off. . |
| 56-123524 | 9/1981 | Japan . |

OTHER PUBLICATIONS

Patent Abstracts of Japan JP 56 123524 A, published Sep. 28, 1981, vol. 005, No. 202 (P–095).

*Primary Examiner*—Howard B. Blankenship
*Attorney, Agent, or Firm*—Robin, Blecker & Daley

[57] ABSTRACT

A camera comprises a first device which makes a head and a film closer to each other, the head being arranged to perform at least either one of recording and reading information on and from the film, a second device which prevents the film from travelling when a film transport device is placed in a stopped state, and an interlocking device which mechanically interlocks the first device and the second device.

6 Claims, 16 Drawing Sheets

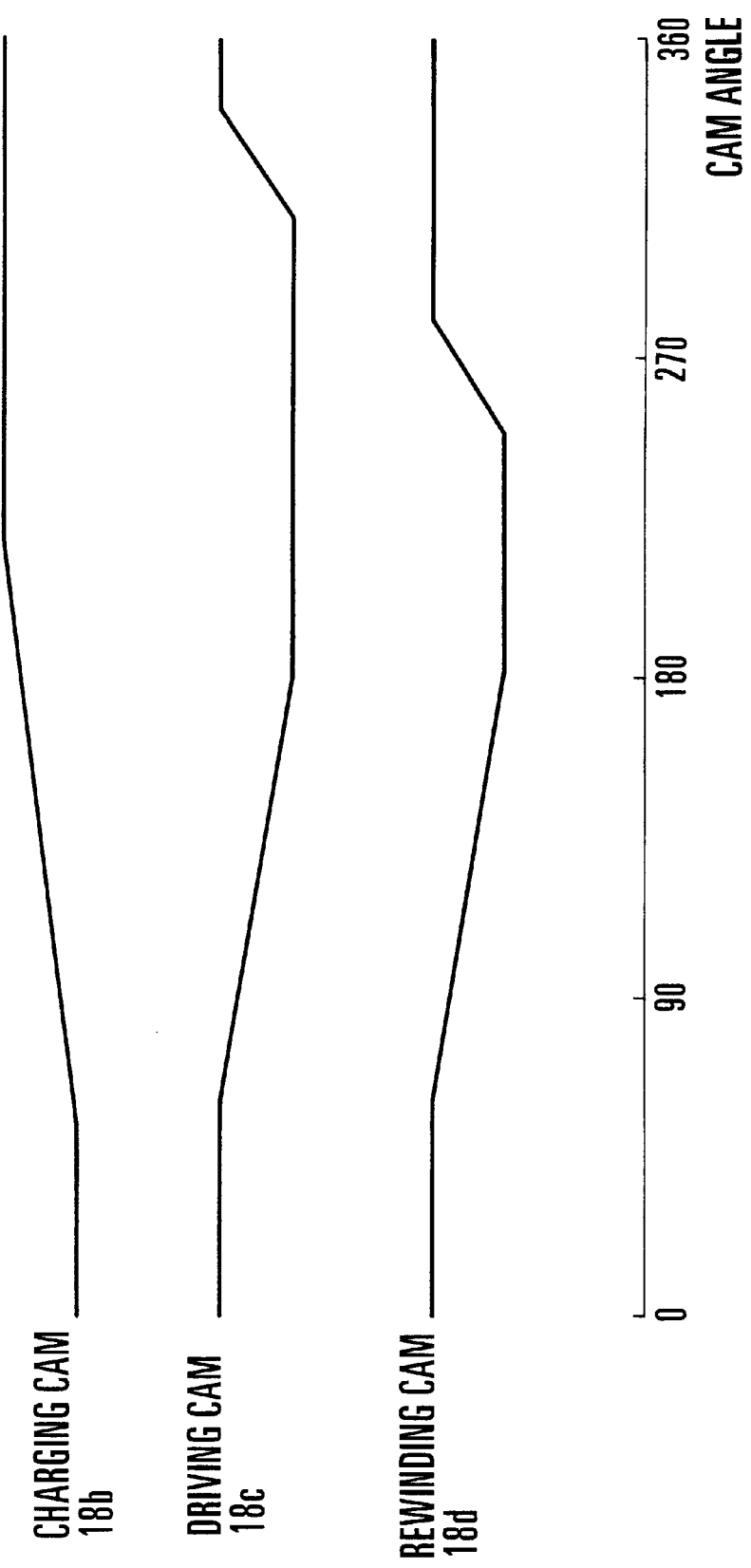

FIG. 18
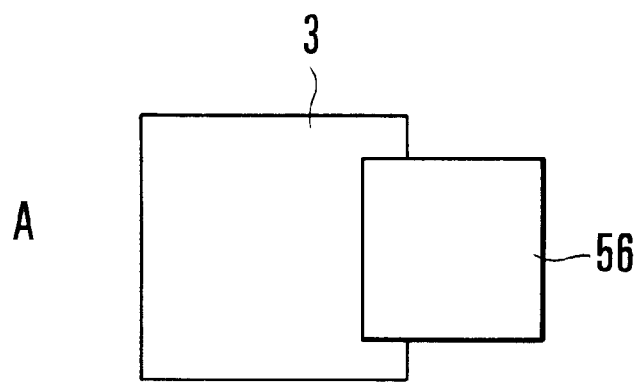
A
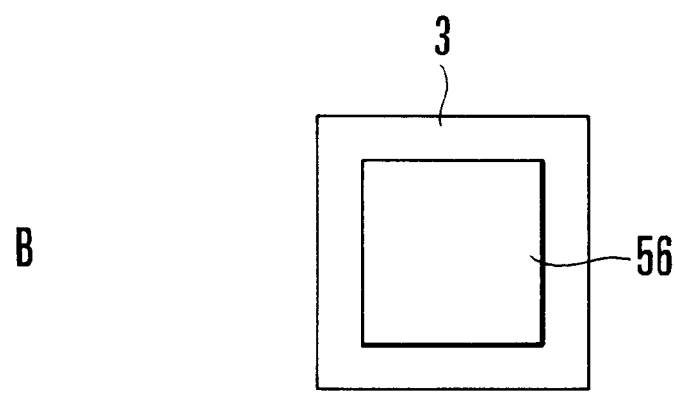
B
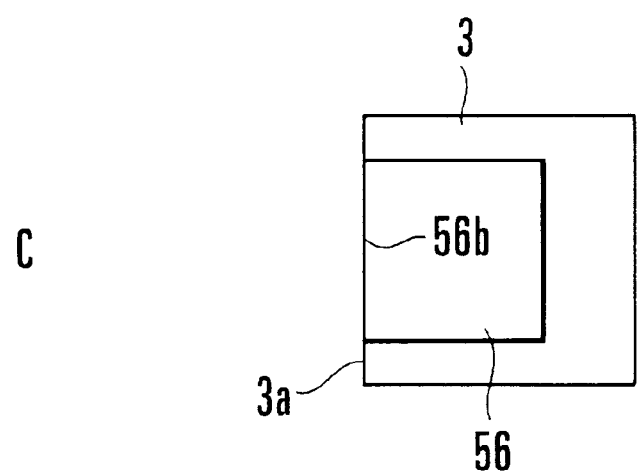
C

CAMERA PREVENTING FILM MOVEMENT IN STOPPED STATE

BACKGROUND OF THE INVENTION

1. Field of the Invention

The present invention relates to a camera and, more particularly, to an arrangement for preventing the positional deviations of photographed frames of a film.

2. Description of the Related Art

If a vibration is applied to a camera placed in a photography standby state, the film accommodated in the camera travels owing to the vibration and causes a number of problems such as a deviation in the positional relationship between the perforations of the film and photographed frames or an overlap of adjacent photographed frames which occurs if the film travels to a large extent.

There are film cartridges of the type which have a film egress/ingress slot provided with a movable light-shielding door. Unlike existing popular film cartridges, this type of film cartridge has a structure in which the film egress/ingress slot is not provided with a light-shielding member made of pile fabric and, therefore, gives no resistance to the film of the film cartridge. In such a film cartridge, a film travel is easily caused by a vibration, and the amount of film travel due to the vibration is large.

The following proposals have been made with respect to a method of preventing the aforesaid travel of the film due to a vibration. Each of the proposals is intended to realize stop control of the film by inserting a claw into a perforation formed in the film.

(i) U.S. Pat. No. 4,903,061 proposes the art of retracting the claw from a film running path during prewinding.

(ii) U.S. Pat. No. 4,914,462 proposes the art of inhibiting the claw from being inserted into a perforation formed in the leader end of the film, during the thrust operation of feeding the film from the film egress/ingress slot for the purpose of automatic loading from a case (film cartridge) in which the film is completely accommodated.

Japanese Laid-Open Patent Application No. Sho 58-125029 and others propose the art of providing a winding stop in a film driving mechanism to perform stop control of the film by engaging the film driving mechanism each time the film is advanced by one frame.

Further, in a camera of the type which performs photography each time the film is wound up by one frame, even if only the take-up spool of the camera or both of the take-up spool of the camera and the cartridge spool are engaged, the film travels in the film winding direction when a vibration is applied to the camera, because although the film is tightly wound around the take-up spool of the camera, it is wound around the cartridge spool in a coil with a certain extent of looseness.

There are also cameras of the type which uses a film having a magnetic recording portion. In this type of camera, during film transport, a magnetic head is brought into abutment with such film to magnetically write or read photography information or the like on or from the film.

However, such a camera has the problems that if the magnetic head is in abutment with the film during photography, the flatness of the film is impaired, and that if the magnetic head remains in contact with the film for a long time, the film may stick to the magnetic head.

To solve the problems, the following proposals have been made with respect to a mechanism for maintaining the magnetic head in abutment with the film only during the writing and reading of magnetic information and normally keeping the magnetic head and the film away from each other.

(i) Japanese Laid-Open Patent Application No. Hei 3-200131 proposes the art of bringing the magnetic head into abutment with the film by a dedicated motor when photography information is to be magnetically written, and normally keeping the magnetic head retracted from the film.

(ii) Japanese Laid-Open Patent Application No. Hei 5-150321 proposes the art of retracting a pressure pad for pressing the film against the magnetic head (hereinafter referred to simply as the pad) in interlocking relation to the operation of the film driving mechanism or a barrier or to a film-cartridge loading operation.

(iii) Japanese Laid-Open Patent Application No. Hei 5-165091 proposes the art of moving backward and forward the magnetic head in interlocking relation to a photographing member, such as a mirror or a shutter charging member, or moving backward and forward the magnetic head by a solenoid plunger.

(iv) Japanese Laid-Open Patent Application No. Hei 3-289639 proposes the art of moving backward and forward the magnetic head by means of a film transporting motor and an electromagnet.

(v) Japanese Laid-Open Patent Application No. Hei 4-68334 proposes the art of normally urging the magnetic head in a direction away from the film and, only during the running of the film, maintaining the magnetic head in abutment with the film by the power of a film running motor.

(vi) Japanese Laid-Open Patent Application No. Hei 6-35060 proposes the art of moving forward and backward the pad for pressing the film against the magnetic head, by means of a cam contained in a gear train for film transport.

(vii) Japanese Laid-Open Patent Application No. Hei 7-92550 proposes the art of moving the magnetic head by means of a motor for charging a mechanism such as a mirror and a shutter.

In each of the mechanisms disclosed in U.S. Pat. Nos. 4,903,061 and 4,914,462, since the claw is inserted into a perforation of the film, it is possible to prevent the film from travelling in either of the film winding and rewinding directions owing to a vibration. To insert the claw into a perforation of the film, it is necessary to stop the film with high accuracy before the insertion of the claw into the perforation. However, actually, the stop position of each perforation varies depending on the normal stopping accuracy of the film, so that it is very difficult to accurately insert the claw into the perforation.

For this reason, in such a system, it is extremely difficult to prevent the film from travelling in either of the film winding and rewinding directions owing to a vibration.

In addition, the respective conventional examples (summarized below as arrangements (a), (b) and (c)) are merely proposals which are independent of each other:

(a) the arrangement for inserting the claw into a perforation of the film, (b) the arrangement for engaging the film driving mechanism, and (c) the arrangement for moving backward and forward the magnetic head or the pad.

If the arrangements (a) to (c) are combined, the following problems occur.

(i) The structure becomes complicated.

(ii) The timing of the operation of each of the arrangements (a) to (c) is difficult to adjust.

(iii) Although each of the arrangements (a) to (c) individually serves to prevent the travel of the film, all of them become inoperative at a particular timing of the operation of each of the arrangements (a) to (c). At this time, the film becomes free, i.e., the travel of the film is not restricted, so that if a vibration or the like occurs, the film easily travels.

(iv) When each of the arrangements (a) to (c) operates, unnecessary force is applied to the film.

SUMMARY OF THE INVENTION

One aspect of the present invention is to provide a camera which comprises a first device which makes a head and a film closer to each other, the head being arranged to perform at least either one of recording and reading information on and from the film, a second device which prevents the film from travelling when a film transport device is placed in a stopped state, and an interlocking device which mechanically interlocks the first device and the second device, so that the operations of the first and second devices can be executed at appropriate timing and such an arrangement is favorable for reductions in size and cost.

The above and other aspects of the present invention will become apparent from the following detailed description of preferred embodiments of the present invention, taken in conjunction with the accompanying drawings.

BRIEF DESCRIPTION OF THE DRAWINGS

FIG. 3(*b*) is a plan view of the cam gear shown in FIG. 3(*a*);

FIG. 4 is a cam diagram of each cam of the cam gear shown in FIGS. 3(*a*) and 3(*b*);

FIGS. 18(A through C) is a view showing the state of engagement between the perforation of the film and the engagement claw in the camera of FIG. 1.

DETAILED DESCRIPTION OF THE PREFERRED EMBODIMENTS

Preferred embodiments of the present invention will be described below with reference to the accompanying drawings.

Figure 1:
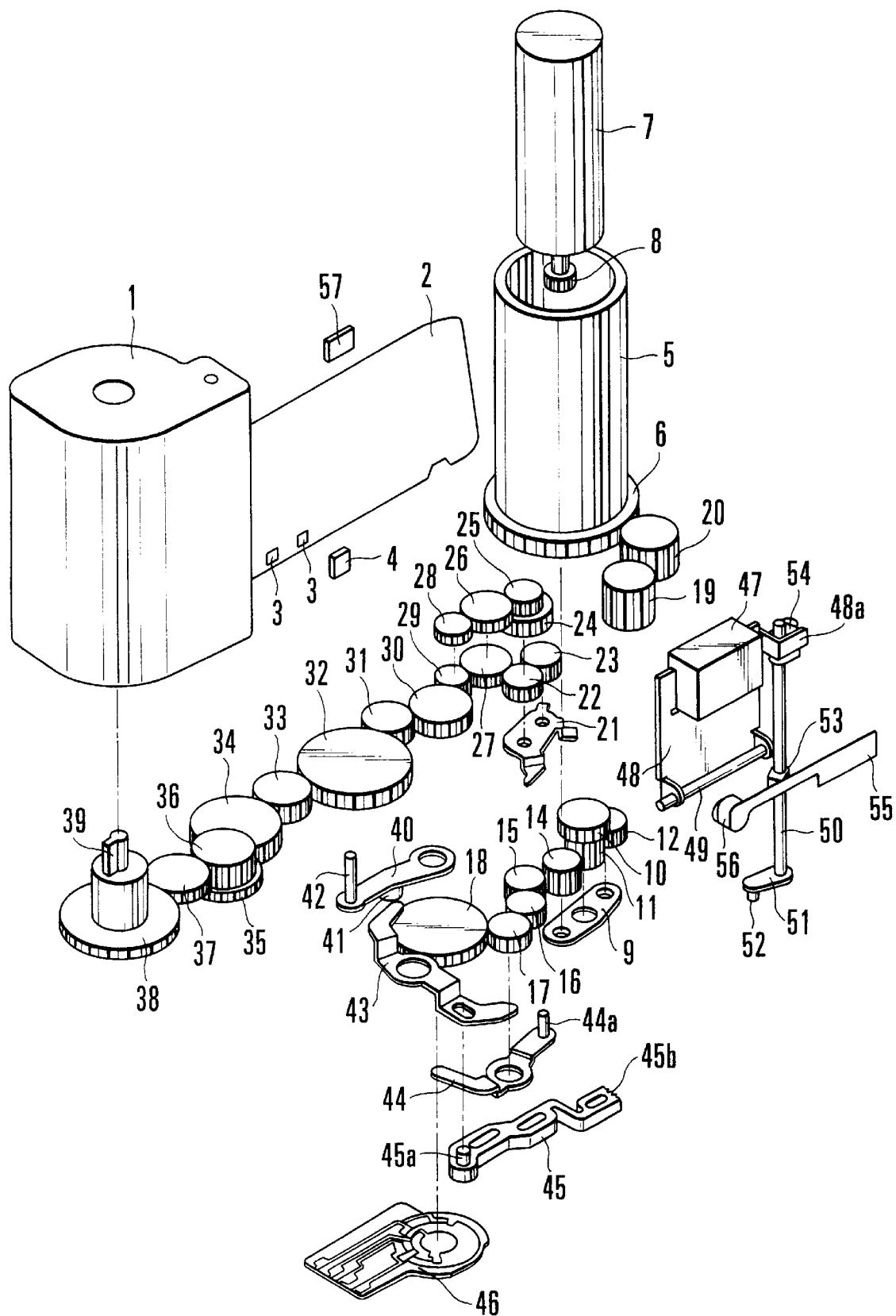
FIG. 1 is an exploded perspective view of a drive transmission system including a film transport mechanism of a camera according to one embodiment of the present invention.

FIG. 1 is an exploded perspective view of a drive transmission system including a film transport mechanism of a camera according to one embodiment of the present invention, as viewed from the back-lid side of the camera.

In FIG. 1, reference numeral 1 denotes a film cartridge, reference numeral 2 denotes a film, reference numeral 3 denotes a positioning perforation formed in the film 2, and reference numeral 4 denotes an optical sensor for detecting the perforation 3.

The film 2 is accommodated in the film cartridge 1 in the state of being wound around its film spool (not shown). If the film spool is rotated in a film feeding direction by a driving key 39 which will be described later, the film 2 is fed out from the film cartridge 1, whereas if the film spool is rotated in the opposite direction, the film 2 is rewound into the film cartridge 1. The optical sensor 4 detects the perforation 3 to carry out position control of the film 2. A take-up spool 5 has a spool gear 6, and the spool gear 6 is provided integrally with the take-up spool 5. A pinion gear 8 is fixed to the output shaft of a motor 7, and the motor 7 is accommodated in the take-up spool 5.

Sun gears 10 and 11, which are integrally formed, and planetary gears 12 and 14 are supported by a planetary arm 9, thereby constituting a known planetary clutch. The sun gear 10 meshes with the pinion gear 8, and the output of the motor 7 is transmitted from the pinion gear 8 to the planetary gears 12 and 14 through the sun gears 10 and 11. Gears 15, 16 and 17 are cam transmission gears, respectively, and a gear 18 is a cam gear.

Figure 3A:
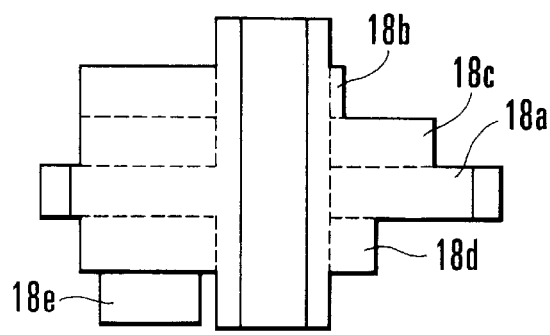
FIG. 3(*a*) is a side view of a cam gear shown in FIG. 1.
Figure 3B:
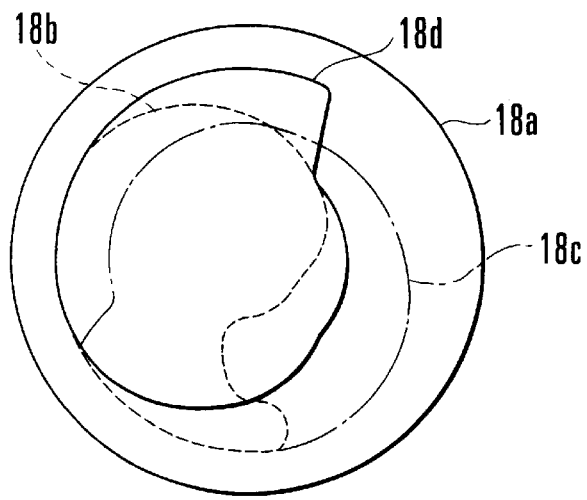

FIGS. 3(*a*) and 3(*b*) show the construction of the cam gear 18. FIG. 3(*a*) is a cross-sectional view of the cam gear 18, and FIG. 3(*b*) shows the shape of each cam as viewed from the bottom of the cam gear 18 shown in FIG. 3(*a*). The cam gear 18 includes a gear 18*a*, a charging cam 18*b* for driving a charging lever 40, a driving cam 18*c* for driving a driving lever 43, a rewinding cam 18*d* for driving a rewinding lever 44, and a phase contact piece 18*e* for detecting the phase of the cam gear 18 through a phase circuit board 46. As shown in FIG. 3(*a*), in the cam gear 18, the charging cam 18*b*, the driving cam 18*c*, the gear 18*a* and the rewinding cam 18*d* are fixedly stacked in that order. The phase contact piece 18*e* is fixed to the bottom of the rewinding cam 18*d*. In FIG. 3(*b*), the dashed line shows the cam shape of the charging cam 18*b*, the chain line shows the cam shape of the driving cam 18*c*, and the solid line shows the cam shape of the rewinding cam 18*d*. FIG. 4 is a cam diagram of each of the cams 18*b*, 18*c* and 18*d*.

As shown in FIG. 1, the planetary gear 14, the cam transmission gears 15, 16 and 17 and the cam gear 18 are serially meshed in that order so as to rotate the cam gear 18.

Gears 19 and 20 are spool driving gears which constitute a film driving mechanism together with the take-up spool 5. The planetary gear 14, the spool driving gears 19 and 20 and the spool gear 6 are serially meshed in that order so as to rotate the take-up spool 5.

A sun gear 22, a rewinding planetary gear 23 and transmission gears 24 and 25 are supported by a rewinding planetary arm 21. The transmission gears 24 and 25 are integrally formed. The sun gear 22 and the transmission gears 24 and 25 are coaxially supported, but no rotation is transmitted between the sun gear 22 and the transmission gears 24 and 25. Transmission gears 26 and 27 are coaxially supported, but no rotation is transmitted between them. Gears 28 and 29 are clutch gears.

Figure 2:
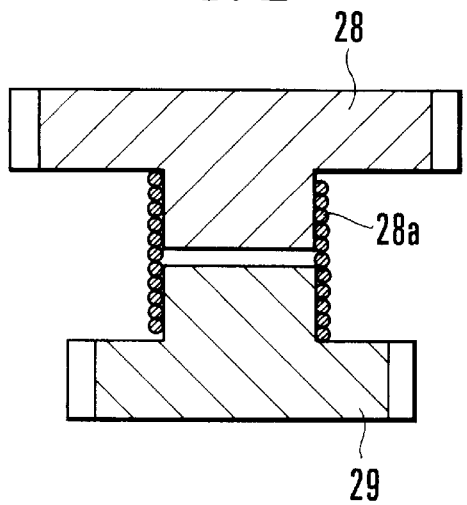
FIG. 2 is a longitudinal sectional view of a clutch gear of the driving transmission system shown in FIG. 1.

As shown in FIG. 2, the clutch gears 28 and 29 and a clutch spring 28*a* constitute a known one-way clutch mechanism. If the clutch gear 28 rotates in the clockwise direction as viewed from below in FIG. 2, the clutch spring 28*a* is tightly wound and the rotation of the clutch gear 28 is transmitted to the clutch gear 29. While the clutch gears 28 and 29 are rotating in the clockwise direction as viewed from below in FIG. 2, if the speed of rotation of the clutch gear 29 becomes faster than that of the clutch gear 28, the clutch spring 28*a* is loosened and a slip takes place between the clutch gears 28 and 29, i.e., the clutch gears 28 and 29 become disengaged.

Gears 30, 31, 32, 33, 34, 35, 36 and 37 are transmission gears. The driving key 39 is formed integrally with a driving gear 38, and is brought into engagement with the film spool (not shown) of the film cartridge 1. If the driving key 39 rotates in the film feeding direction in the state of being engaged with the film spool, the film 2 is fed out from the film cartridge 1, whereas if the driving key 39 rotates in the opposite direction, the film 2 is rewound into the film cartridge 1.

The charging lever 40 has a charging roller 41 and a charging pin 42. The charging roller 41 is rotatably supported by the charging lever 40, while the charging pin 42 is fixed to the charging lever 40. The charging lever 40 is pivotally moved by the charging cam 18*b* and performs a shutter charging operation, a mirror-up operation and a mirror-down operation, in a manner which will be described later. The driving lever 43 is pivotally moved by the driving cam 18*c* and performs a winding stopping operation and the operation of moving backward and forward a perforation engagement member and a magnetic head, in a manner which will be described later. The rewinding lever 44 is pivotally moved by the rewinding cam 18*d* and changes over the rewinding planetary arm 21 from one position to another, in a manner which will be described later. A winding stopping lever 45 constitutes a winding stopping mechanism, and is driven by the driving lever 43 so that an engagement toothed portion 45*b* engages with the spool driving gear 19 to prevent the motion thereof, in a manner which will be described later. The phase circuit board 46 detects the phase of the cam gear 18 through the phase contact piece 18*e* fixed to the cam gear 18. A mirror-up phase, a film winding phase, a film rewinding phase and a standby phase are detected.

A magnetic head 47 for performing at least one of recording and reading information on or from the film 2 is fixed to a head holder 48 which is supported by a head holder shaft 49. A pad 57 serves as a pressure member. The head holder shaft 49 is fixed to a pressure plate of a camera body (not shown). The head holder 48 is urged by a pressure spring (not shown) in the direction of pressing the magnetic head 47 against the pad 57. The head holder 48 pivots on the head holder shaft 49, so that the magnetic head 47 is moved backward and forward.

A retracting lever 51 is fixed to one end of a connecting shaft 50, and a retracting lever pin 52 is fixed to the retracting lever 51. An engagement cam 53 is fixed to a middle portion of the connecting shaft 50. An engagement claw 56 which serves as a film travel preventing member and film engagement means is fixed to a leaf spring 55. A head retracting cam 54 is fixed to the other end of the connecting shaft 50.

As shown in FIG. 1, the connecting shaft 50 is placed in a first state by a return spring (not shown). In the first state, the engagement cam 53 presses the leaf spring 55 and the engagement claw 56 is located at a position where it is disengaged from the perforation 3. The head retracting cam 54 does not abut on an abutment portion 48*a* of the head holder 48, and the magnetic head 47 is placed in a first position in which it is pressed against the pad 57 by the pressure spring (not shown).

FIGS. 5 to 8 are views showing one example of mirror driving and one example of shutter charging driving which are performed in the camera. In FIGS. 5 to 8, reference numeral 150 denotes a mirror lever, reference numeral 151 denotes a mirror driving spring, reference numeral 152 denotes a mirror-down urging spring, reference numeral 153 denotes a mirror receiving plate, and reference numeral 154 denotes a shutter charging lever.

Figure 5:
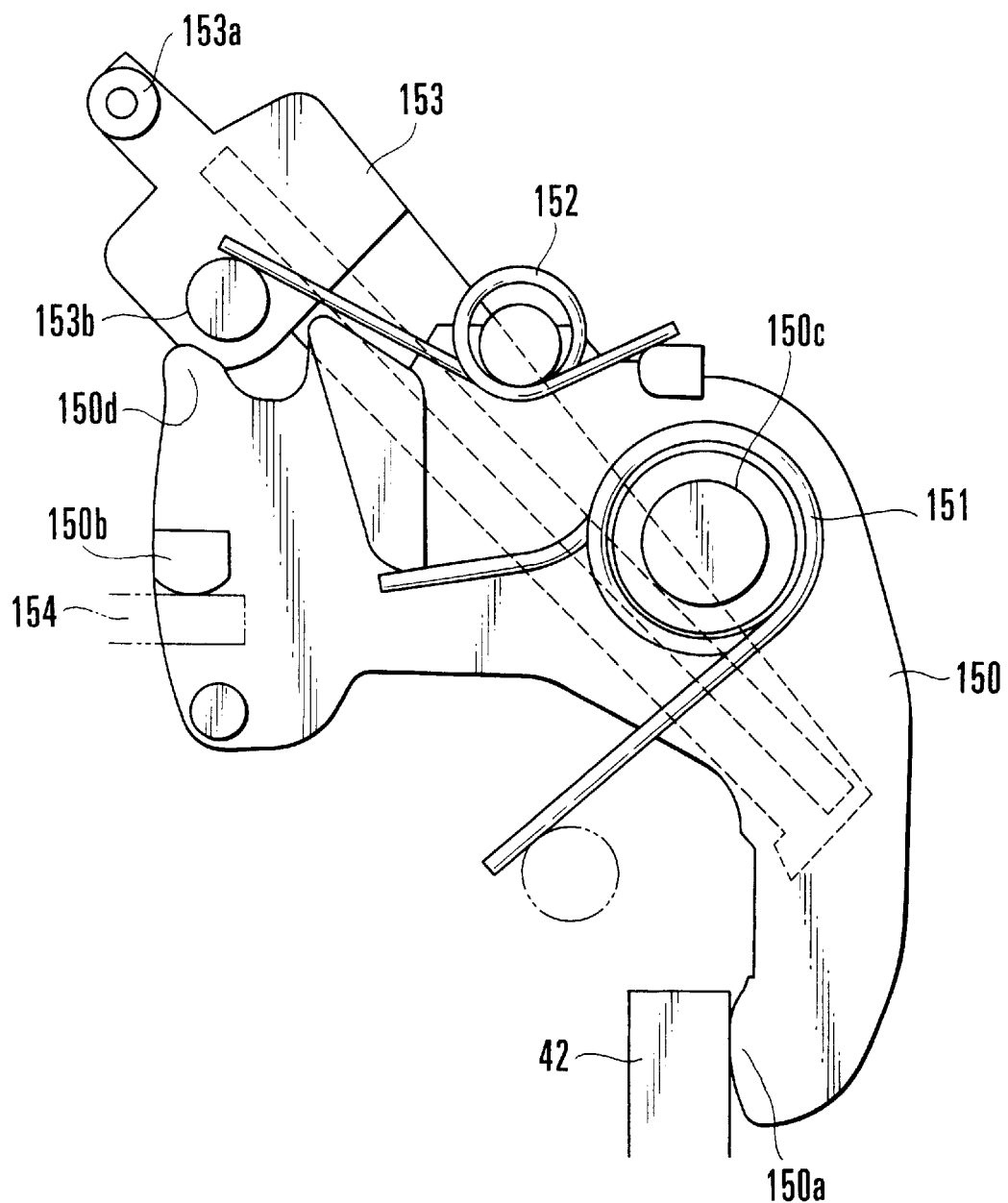
FIG. 5 is a side view of a mirror driving system of the camera shown in FIG. 1, showing a mirror-down state.

FIGS. 5 and 7(*a*) are views showing a mirror-down state. In this mirror-down state, the charging roller 41 provided on the charging lever 40 is located at the cam top position of the charging cam 18*b*, the charging lever 40 is located at the mirror-down position shown in FIG. 7(*a*), and the charging pin 42 of the charging lever 40 abuts on one end 150*a* of the mirror lever 150. Incidentally, the clockwise rotating force of the mirror driving spring 151 acts on the mirror lever 150 so that the mirror lever 150 is located at the mirror-down position shown in FIG. 5. The mirror-down spring 152 presses down a driving pin 153*b* provided on the mirror receiving plate 153, whereby the mirror receiving plate 153 is placed at its mirror-down position.

Figure 6:
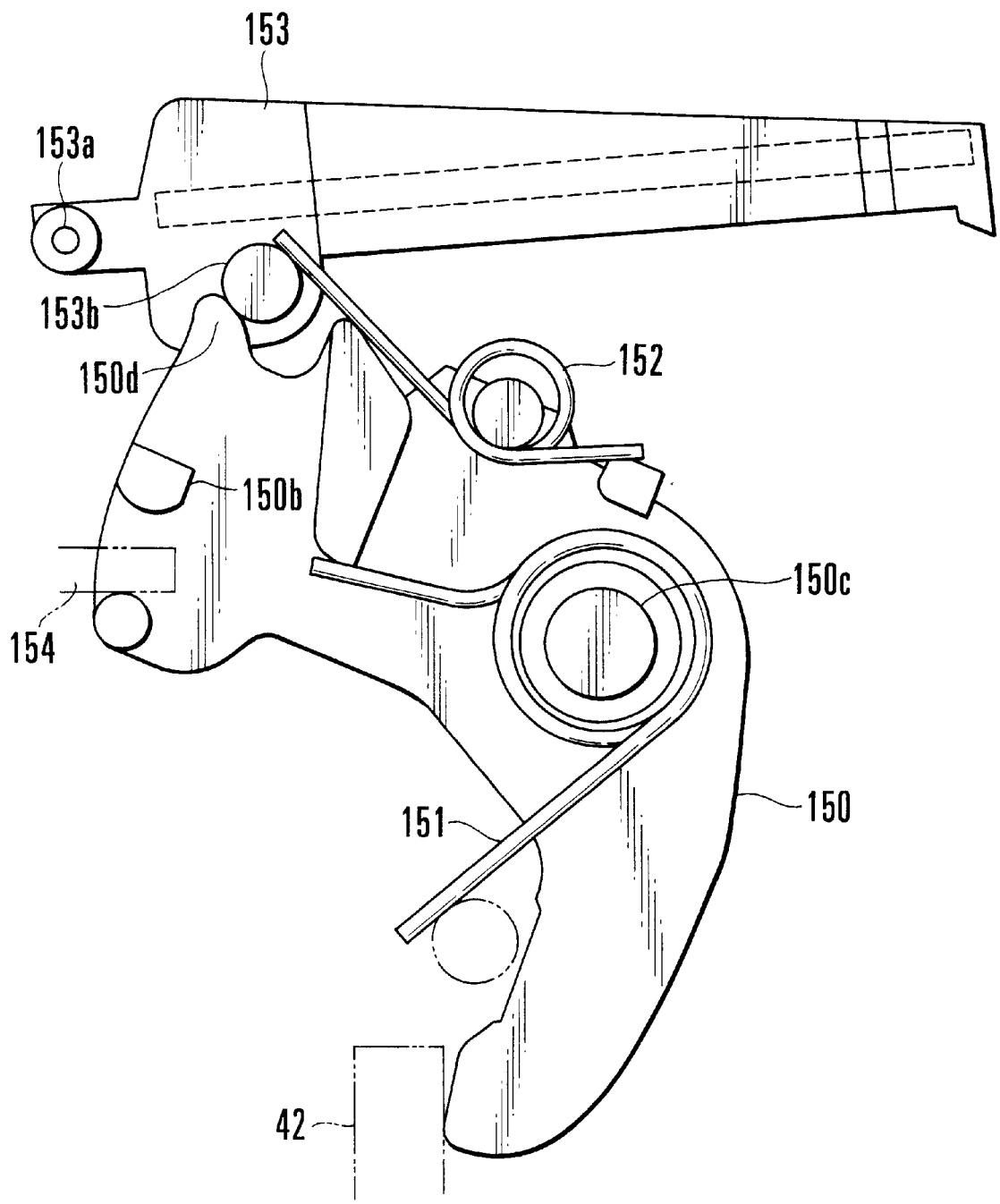
FIG. 6 is a side view of the mirror driving system of the camera shown in FIG. 1, showing a mirror-up state.
Figure 7A:
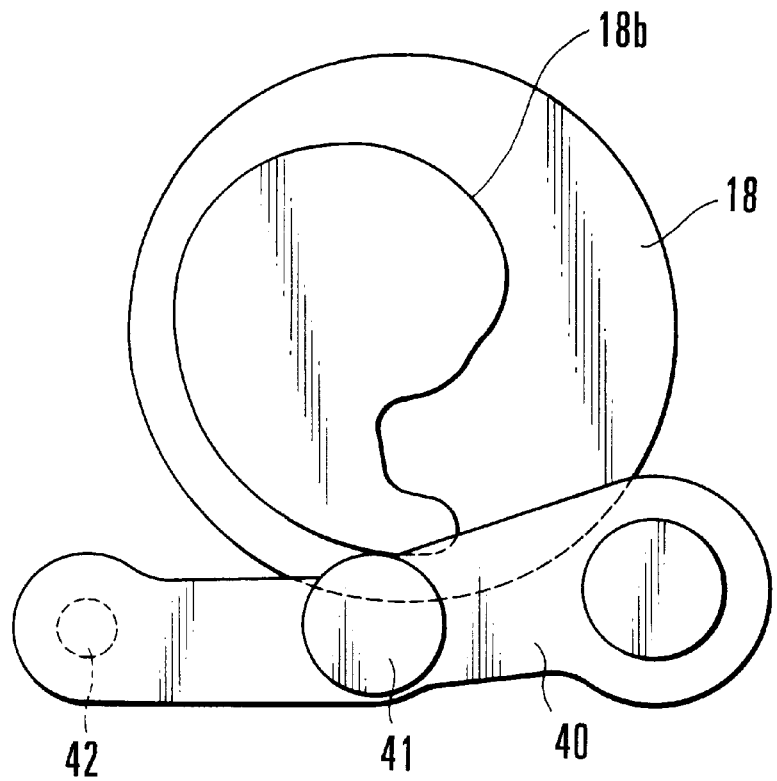
FIGS. 7(*a*) and 7(*b*) are plan views showing the relationship between the cam gear and a charging lever of FIG. 1, FIG. 7(*a*) showing the state in which the charging lever abuts on a cam top position of the cam gear and FIG. 7(*b*) showing the state in which the charging lever abuts on a cam bottom position of the cam gear.
Figure 7B:
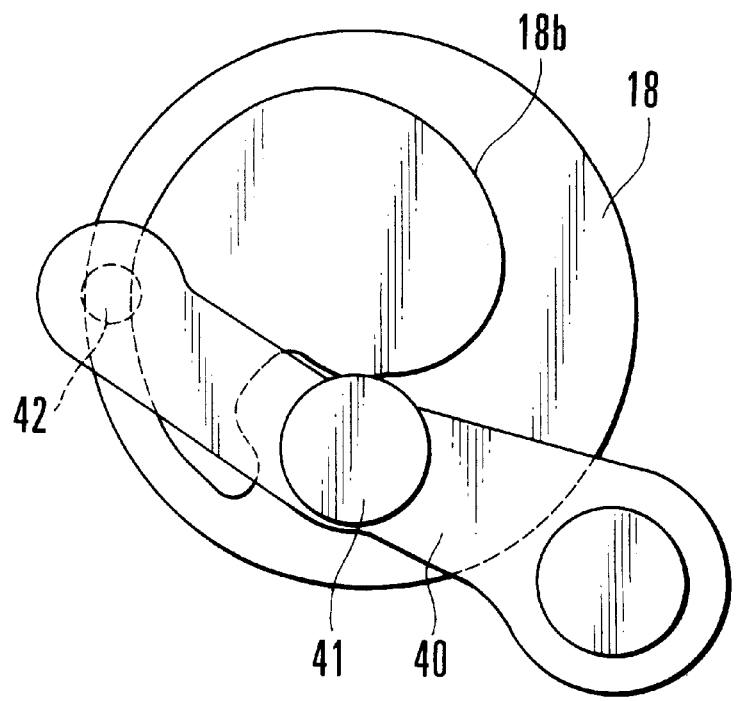

FIGS. 6 and 7(*b*) are views showing a mirror-up state. During a mirror-up operation, the cam gear 18 is made to rotate from the state shown in FIG. 7(*a*) in the clockwise direction by a method which will be described later. When the charging roller 41 comes off the cam top of the charging cam 18*b*, the charging lever 40 becomes free and the mirror lever 150 rotates about a shaft 150*c* in the clockwise direction (as viewed in FIG. 6) by the force of the mirror driving spring 151. When the mirror lever 150 rotates in the clockwise direction, one end 150*d* of the mirror lever 150 comes into abutment with the driving pin 153*b* of the mirror receiving plate 153 and presses the driving pin 153*b* upwardly. Thus, the mirror receiving plate 153 rotates about a hinge shaft 153*a* in the counterclockwise direction, whereby the mirror receiving plate 153 is placed into its mirror-up position. When the mirror-up operation is performed, another end 150*a* of the mirror lever 150 which is turning presses the charging pin 42 and the charging roller 41 comes into abutment with the cam bottom of the charging cam 18b, as shown in FIG. 7(b), whereby the charging lever 40 is placed into its mirror-up position.

Figure 8:
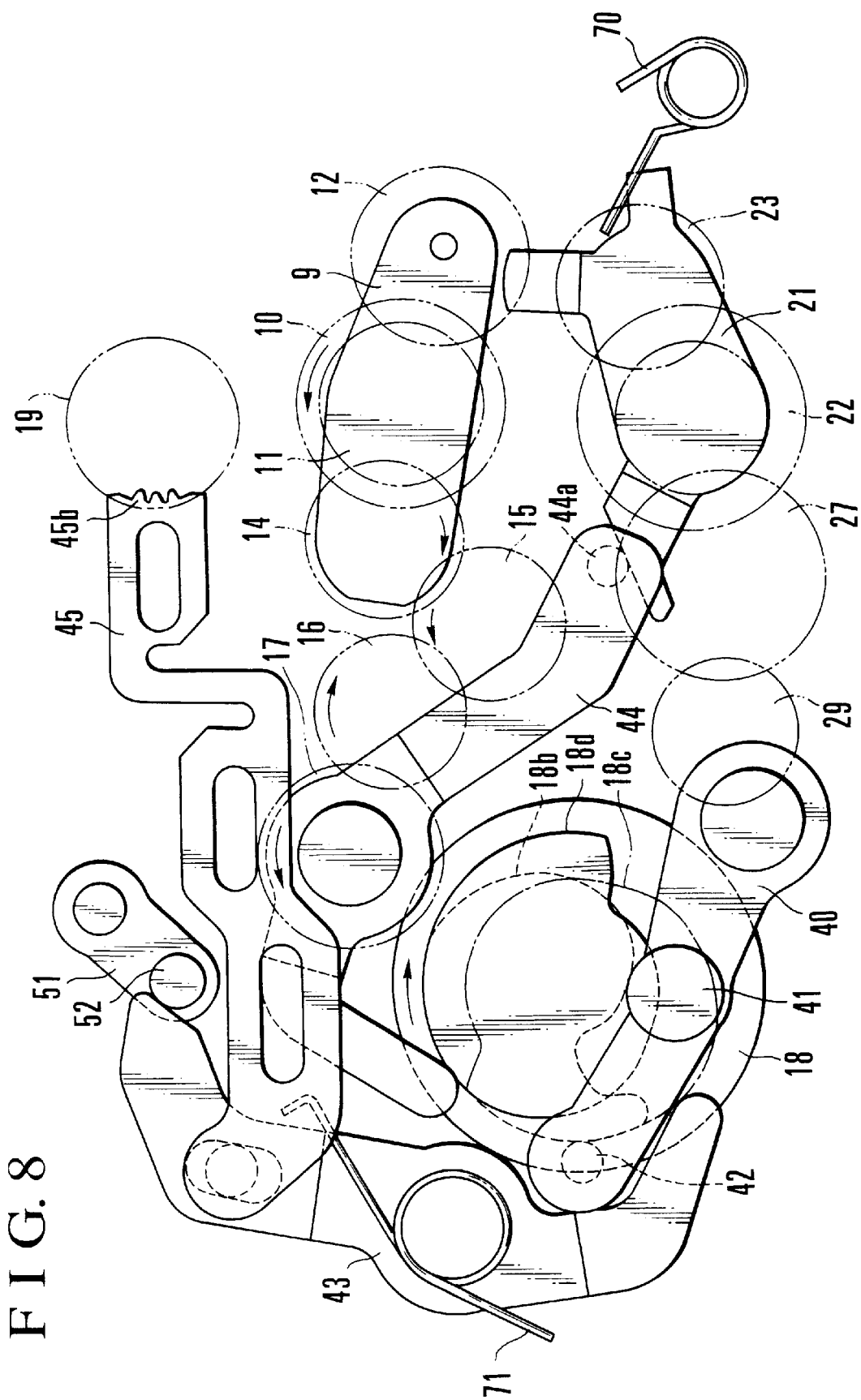
FIG. 8 is a plan view of the driving transmission system of FIG. 1, showing a state in which the driving transmission system is placed when a motor is driven in the forward direction.

During a mirror-down operation and a shutter charging operation, the cam gear 18 is made to rotate from the state shown in FIG. 7(b) in the clockwise direction by a method which will be described later. As the cam gear 18 rotates in the clockwise direction, the charging roller 41 rotates the charging lever 40 in the counterclockwise direction in accordance with the charging cam 18b, as shown in FIG. 8. Thus, the charging pin 42 provided at one turning end of the charging lever 40 comes into abutment with the end 150a of the mirror lever 150, thereby driving the mirror lever 150 in the counterclockwise direction. When the mirror lever 150 turns in the counterclockwise direction, a pin 150b provided on the mirror lever 150 shown in FIG. 5 presses the shutter charging lever 154 downwardly, thereby performing shutter charging. On the other hand, if the mirror lever 150 rotates in the counterclockwise direction, the mirror lever 150 presses downwardly the driving pin 153b provided on the mirror receiving plate 153, via the mirror-down urging spring 152, to perform the mirror-down operation. Thus, the mirror receiving plate 153 is placed into the mirror-down state shown in FIGS. 5 and 7(a).

The operation of the present embodiment will be described below with reference to FIGS. 8 to 11. FIGS. 8 to 11 are views of the operation of the arrangement of FIG. 1 as viewed from its bottom side.

In FIGS. 8 to 11, reference numeral 70 denotes a return spring for urging the rewinding planetary arm 21 in the clockwise direction, and reference numeral 71 denotes a driving-lever return spring for urging the driving lever 43 in the counterclockwise direction.

FIG. 8 shows the state of performing shutter charging, mirror driving and phase change-over. When the motor 7 is rotated in the clockwise direction, the pinion gear 8 also rotates in the clockwise direction, and the sun gears 10 and 11, which mesh with the pinion gear 8 as a double gear, rotate in the counterclockwise direction and the planetary arm 9 rotates in the counterclockwise direction. The planetary gear 14 meshes with the cam transmission gear 15 and the rotation is transmitted to the cam gear 18 via the cam transmission gears 15, 16 and 17, so that the cam gear 18 rotates in the clockwise direction. During this time, the planetary gear 12 is located at a neutral position where it meshes with nothing. With the rotation of the cam gear 18, the charging lever 40, the rewinding lever 44 and the driving lever 43 turn in accordance with the charging cam 18b, the rewinding cam 18d and the driving cam 18c, respectively.

This operation is performed when the film cartridge 1 is loaded, in order to rotate the bar code disk of the film cartridge 1 and read film information and the like.

When the cam gear 18 is made to rotate in the clockwise direction by the clockwise rotation of the motor 7, the charging lever 40 turns in the direction in which the aforesaid shutter charging and mirror driving are performed, and the rewinding lever 44 and the driving lever 43 perform operations which will be described later.

Figure 9:
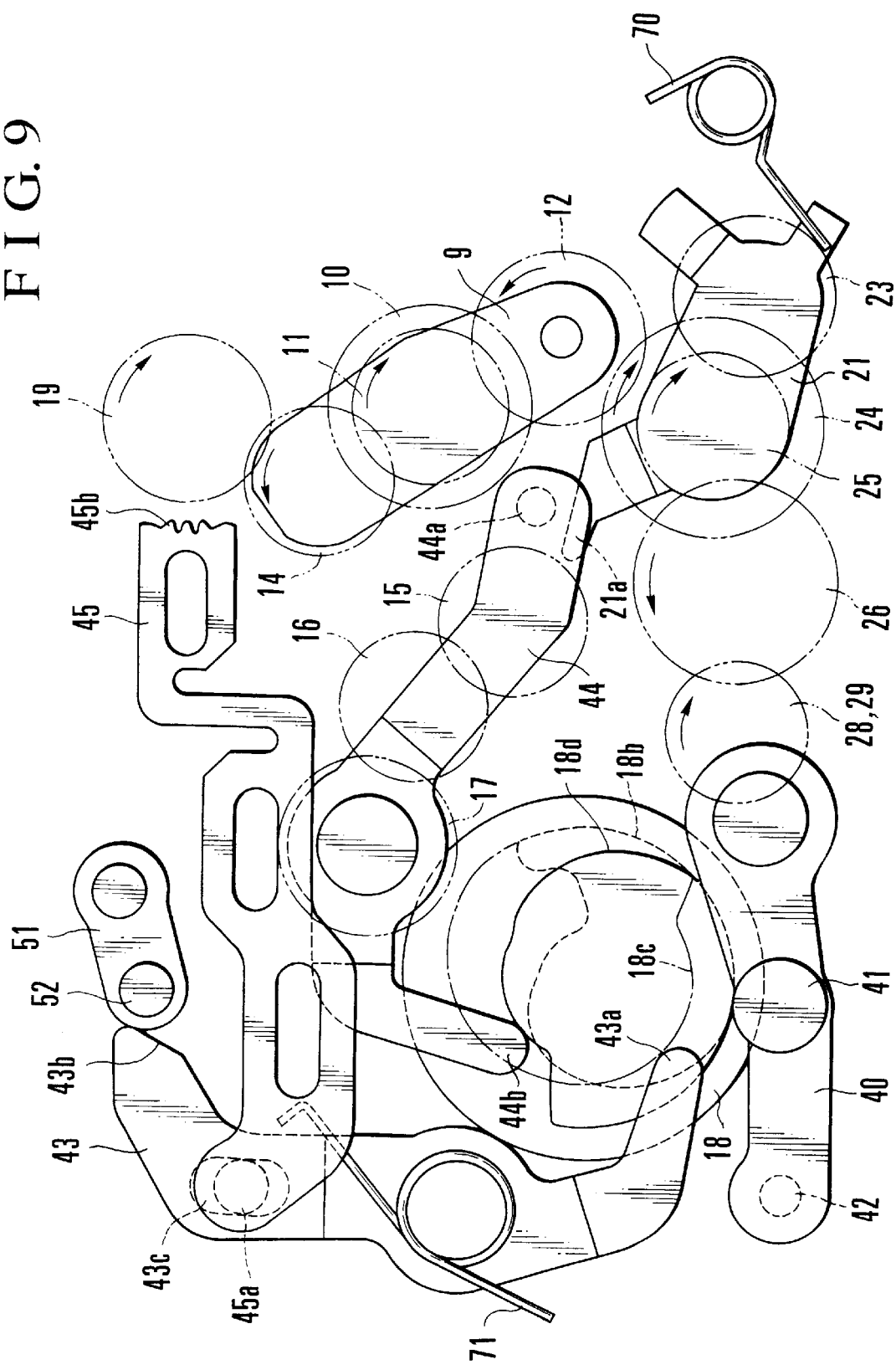
FIG. 9 is a plan view of the driving transmission system of FIG. 1, showing a state in which the driving transmission system is placed when the motor is driven from the state of FIG. 8 in the reverse direction.

FIG. 9 is a view showing the state of the thrust operation of performing film winding and feeding the film 2 from the film cartridge 1. When the motor 7 rotates in the clockwise direction to a further extent in the state of FIG. 8 and the clockwise rotation of the cam gear 18 continues, the film winding phase is detected through the phase contact piece 18e and the phase circuit board 46, and the rotation of the motor 7 is stopped. FIG. 9 shows this state. In the shown state for film transport, the charging roller 41 is located at the cam top of the charging cam 18b, and the charging lever 40 is placed in its shutter-charging completion state and its mirror-down state.

The driving lever 43 is urged in the counterclockwise direction by the driving-lever return spring 71, and one end 43a of the driving lever 43 is positioned in abutment with the cam bottom of the driving cam 18c. A projection 45a which is formed at one end of the winding stopping lever 45 connected to the driving lever 43 is engaged with a slot 43c of the driving lever 43, and the toothed portion 45b formed at the other end of the winding stopping lever 45 is released from the engagement with the spool driving gear 19 which meshes with the spool gear 6 of the take-up spool 5 of the camera body.

The retracting lever pin 52 for retracting the magnetic head 47 and its associated parts is not in contact with one end 43b of the driving lever 43, so that the retracting lever 51 is located at the first position shown in FIG. 1 by being rotated in the clockwise direction as viewed in FIG. 9 by a return spring (not shown). Accordingly, the magnetic head 47 is pressed against the pad 57 and the engagement claw 56 is located at a position where it is disengaged from the perforation 3. In other words, the winding of the film 2 is possible.

Referring to FIG. 8, the rewinding planetary arm 21 is urged in the clockwise direction by the return spring 70 and is located at a retracted position where the rewinding planetary gear 23 and the planetary gear 12 does not mesh with each other. When the cam gear 18 rotates from the state of FIG. 8 in the clockwise direction, a pin 44a of the rewinding lever 44 is pressed by a lever portion 21a of the rewinding planetary arm 21, so that the rewinding lever 44 is rotated in the counterclockwise direction. Thus, the rewinding lever 44 is placed into a retracted position where its one end 44b abuts on the cam bottom of the rewinding cam 18d.

After the shown arrangement proceeds from the state shown in FIG. 8 to the state shown in FIG. 9 and the rotation of the motor 7 is stopped, if the clockwise rotation of the motor 7 is reversed to cause the motor 7 to rotate in the counterclockwise direction, the pinion gear 8 also rotates in the counterclockwise direction. By the counterclockwise rotation of the pinion gear 8, the sun gears 10 and 11, which mesh with the pinion gear 8 as a double gear, rotate in the clockwise direction. The planetary arm 9 rotates in the clockwise direction, and the planetary gear 14 meshes with the spool driving gear 19 which is present on the revolution locus of the planetary gear 14. The rotation is transmitted to the spool gear 6 via the spool driving gears 19 and 20 and the take-up spool 5 is rotated in the counterclockwise winding direction as viewed from the top portion of the sheet of FIG. 1.

In addition, the other planetary gear 12 secured to the planetary arm 9 meshes with the transmission gear 24, and the rotation is transmitted to the clutch gear 28 via the transmission gears 24, 25 and 26. Since the clutch gear 28 rotates in the clockwise direction, the clutch spring 28a is tightly wound and the rotation of the clutch gear 28 is transmitted to the clutch gear 29. The rotation is transmitted to the driving gear 38 via the clutch gear 29 and the transmission gears 30, 31, 32, 33, 34, 35, 36 and 37, so that the driving key 39 rotates in the counterclockwise film feeding direction as viewed from the top portion of the sheet of FIG. 1.

The film spool of the film cartridge 1 engages with the driving key 39 and rotates in the film feeding direction, so that the film 2 is fed out from the film cartridge 1. When the leading end of the film 2 reaches the take-up spool 5, the film 2 is wound around the take-up spool 5 by a known automatic loading mechanism (not shown). In this case, the relationship between a velocity V1 at which the film 2 is fed out from the film cartridge 1 and a velocity V2 at which the film 2 is wound around the take-up spool 5 is selected to be V2>V1. Accordingly, when the film 2 is wound around the take-up spool 5, since the rotational speed of the clutch gear 29 is faster than that of the clutch gear 28, the clutch spring 28a becomes loose and a slip takes place between the clutch gears 28 and 29, so that the clutch gears 28 and 29 are disengaged.

Figure 10:
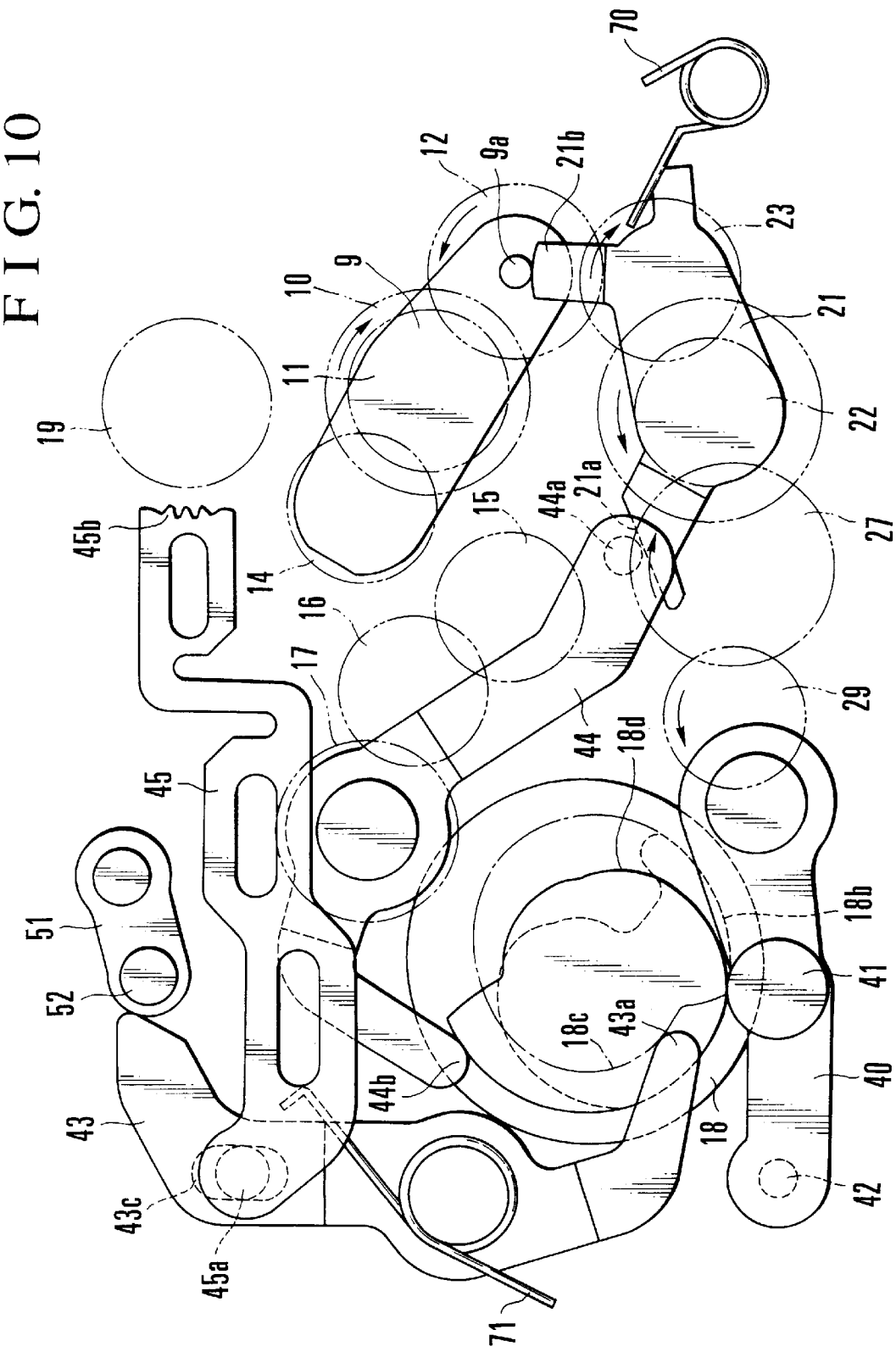
FIG. 10 is a plan view of the driving transmission system of FIG. 1, showing a state in which the driving transmission system is placed when the motor is driven further in the reverse direction from the state of FIG. 9.

FIG. 10 is a view showing the state of performing rewinding.

The state shown in FIG. 10 is such that the cam gear 18 is rotated from the state of FIG. 8 in the clockwise direction and the film rewinding phase is detected through the phase contact piece 18e and the phase circuit board 46 so that the motor 7 is stopped.

The charging roller 41 of the charging lever 40 is located at the cam top of the charging cam 18b, and the shutter charging operation and the mirror-down operation are completed. The driving lever 43 is urged in the counterclockwise direction by the driving-lever return spring 71, and the end 43a of the driving lever 43 is positioned in abutment with the cam bottom of the driving cam 18c. In this state, the projection 45a of the winding stopping lever 45 connected to the driving lever 43 is engaged with the slot 43c of the driving lever 43, and the toothed portion 45b is released from the engagement with the spool driving gear 19.

Figure 11:
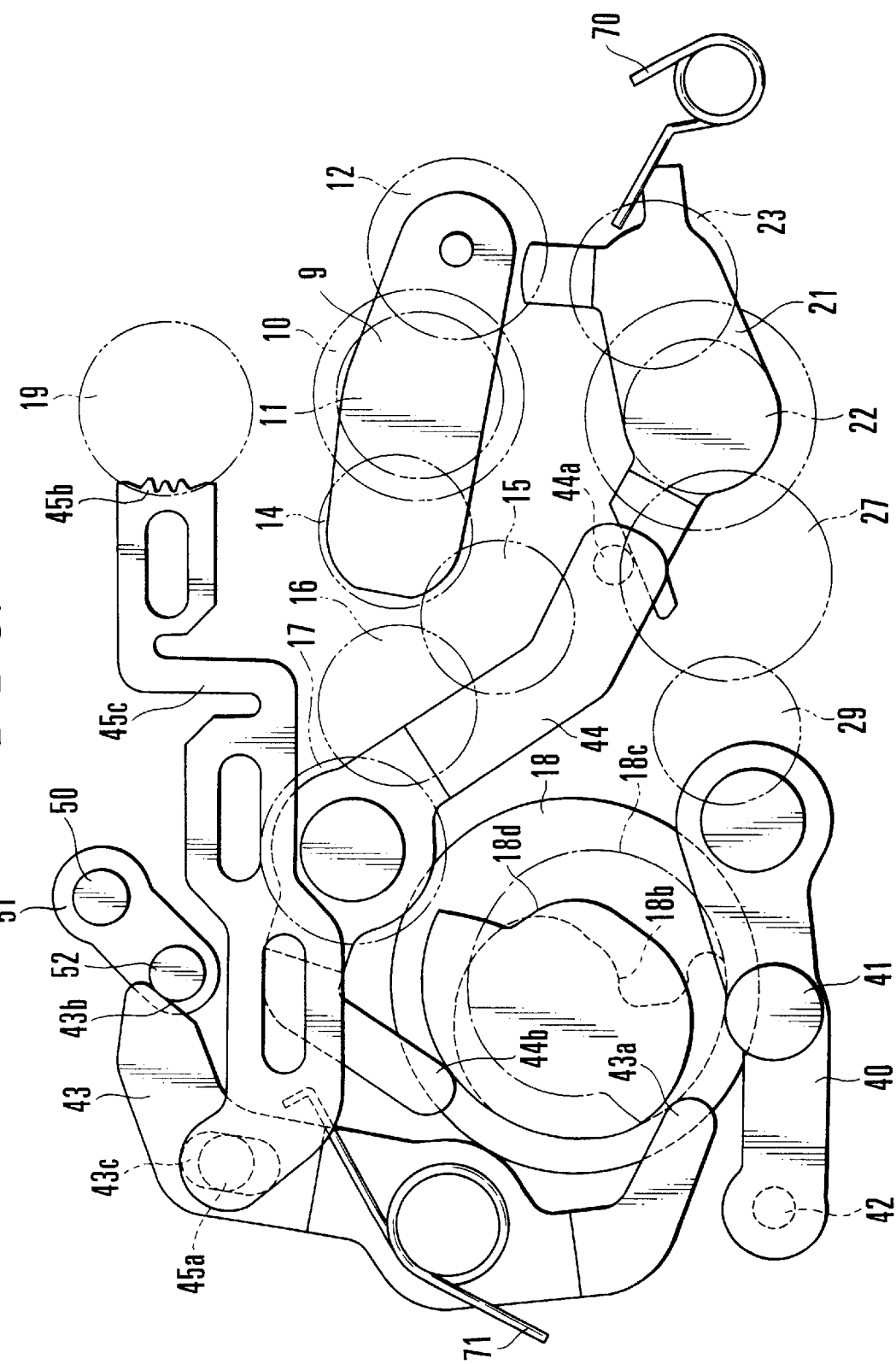
FIG. 11 is a plan view of the driving transmission system of FIG. 1, showing a state in which the driving transmission system is placed when the motor is driven further in the reverse direction from the state of FIG. 10.

The retracting lever pin 52 is not in contact with the end 43b of the driving lever 43, so that the retracting lever 51 is located at the first position shown in FIG. 1 by being rotated in the clockwise direction as viewed in FIG. 11 by the return spring (not shown). Accordingly, the magnetic head 47 is pressed against the pad 57 and the engagement claw 56 is located at the position where it is disengaged from the perforation 3.

The end 44b of the rewinding lever 44 is pressed by the rewinding cam 18d, so that the rewinding lever 44 is rotated in the clockwise direction and the end 44b is positioned at the cam top of the rewinding cam 18d. The pin 44a provided on the rewinding lever 44 presses the lever portion 21a of the rewinding planetary arm 21 to rotate the rewinding planetary arm 21 in the counterclockwise direction against the force of the return spring 70. Thus, the rewinding planetary arm 21 is located at a rewinding position.

When the motor 7 is rotated in the counterclockwise direction, the pinion gear 8 also rotates in the counterclockwise direction. The sun gears 10 and 11, which mesh with the pinion gear 8 as a double gear, rotate in the clockwise direction and the planetary arm 9 rotates in the clockwise direction. A pin 9a provided on the planetary arm 9 and a stopper portion 21b provided on the rewinding planetary arm 21 come into abutment with each other, so that the planetary gear 12 and the rewinding planetary gear 23 mesh with each other with a correct axis-to-axis distance retained therebetween.

In this state, the rotation is transmitted from the rewinding planetary gear 23 to the driving gear 38 through the sun gear 22, the transmission gear 27, the one-way clutch gear 29 and the transmission gears 30, 31, 32, 33, 34, 35, 36 and 37, so that the driving key 39 rotates in the clockwise film rewinding direction as viewed from the top portion of the sheet of FIG. 1. During this time, since the spool driving gear 19 does not mesh with the planetary gear 14, the take-up spool 5 rotates with a small load.

Incidentally, the film spool of the film cartridge 1 is engaged with the driving key 39, and the film 2 is rewound into the film cartridge 1 by the rotation of the film spool in the film rewinding direction.

FIG. 11 shows a standby state.

The state shown in FIG. 11 is such that the cam gear 18 is rotated from the state of FIG. 8 in the clockwise direction and the standby phase is detected through the phase contact piece 18e and the phase circuit board 46 so that the motor 7 is stopped.

The charging lever 40 is placed in the shutter-charging completion state and the mirror-down state which have been described with reference to FIG. 9. The rewinding lever 44 and the rewinding planetary arm 21 are placed in the rewinding state which has been described with reference to FIG. 10.

The driving lever 43 is rotated in the clockwise direction by the end 43a being pressed by the driving cam 18c, and the end 43a is located at the cam top position of the driving cam 18c. In this state, the projection 45a of the winding stopping lever 45 connected to the driving lever 43 is engaged with the slot 43c of the driving lever 43 and is pressed toward the right (as viewed in FIG. 11), so that the toothed portion 45b is positioned in engagement with the spool driving gear 19. A bent portion 45c of the winding stopping lever 45 has elasticity and plays the role of absorbing a stroke when the teeth of the toothed portion 45b strikes the teeth of the spool driving gear 19, so that an excessive force is prevented from acting on the toothed portion 45b and the spool driving gear 19.

Since the spool driving gear 19 is engaged with the toothed portion 45b, even if a vibration is applied to the take-up spool 5, the take-up spool 5 does not move and the film 2 does not travel in the film rewinding direction.

The end 43b of the driving lever 43 presses the retracting lever pin 52, so that the retracting lever 51 rotates in the clockwise direction as viewed from the top portion of the sheet of FIG. 1 (in FIG. 11, in the counterclockwise direction).

Accordingly, the head retracting cam 54 is rotated by the connecting shaft 50 in the clockwise direction as viewed from the top portion of the sheet of FIG. 1, and the head retracting cam 54 comes into abutment with the abutment portion 48a of the head holder 48. The head retracting cam 54 presses the abutment portion 48a, so that the magnetic head 47 is retracted against the pressure spring (not shown) to a second position where the magnetic head 47 has no contact with the film 2. Incidentally, when photography is performed during this state, since the magnetic head 47 is not in contact with the film 2, the flatness of the film 2 is prevented from being impaired.

Since the above-described state is set as the standby state, the magnetic head 47 is prevented from being placed in contact with the film 2 for a long time, so that it is possible to prevent occurrence of the problem that the film 2 sticks to the magnetic head 47.

Figure 12:
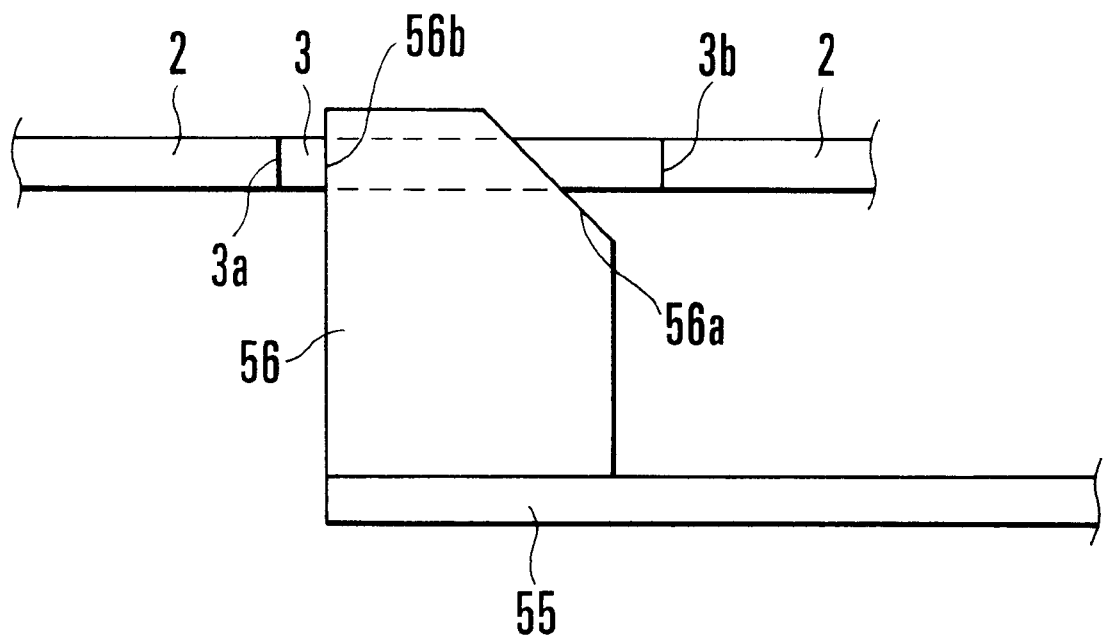
FIG. 12 is a schematic view showing the state of engagement between an engagement claw and a perforation, both of which are shown in FIG. 1.

In the meantime, the engagement cam 53 is released from the abutment with the leaf spring 55 by being rotated by the connecting shaft 50 in the clockwise direction as viewed from the top portion of the sheet of FIG. 1. Accordingly, the engagement claw 56 is inserted into the perforation 3 by the leaf spring 55 and engages with the perforation 3 to prevent the travel of the film 2. FIG. 12 is a cross-sectional view, taken from the top portion of the sheet of FIG. 1, showing the state in which the travel of the film 2 is prevented by the engagement between the engagement claw 56 and the perforation 3.

The engagement claw 56 is inserted into the perforation 3 of the film 2 to prevent the travel of the film 2. As shown in FIG. 12, the engagement claw 56 has an engagement portion 56b on the side of the film cartridge 1 so that the engagement portion 56b can engage with the film 2 to prevent the travel thereof. In addition, the engagement claw 56 has an inclined surface 56a on the side of the take-up spool 5 so as not to engage with the film 2. Accordingly, if the film 2 travels in the film winding direction, i.e., toward the right as viewed in FIG. 12, by the application of a vibration, the engagement portion 56b of the engagement claw 56 comes into abutment with one side 3a of the perforation 3, so that the film 2 is prevented from travelling in the film winding direction.

Figure 17:
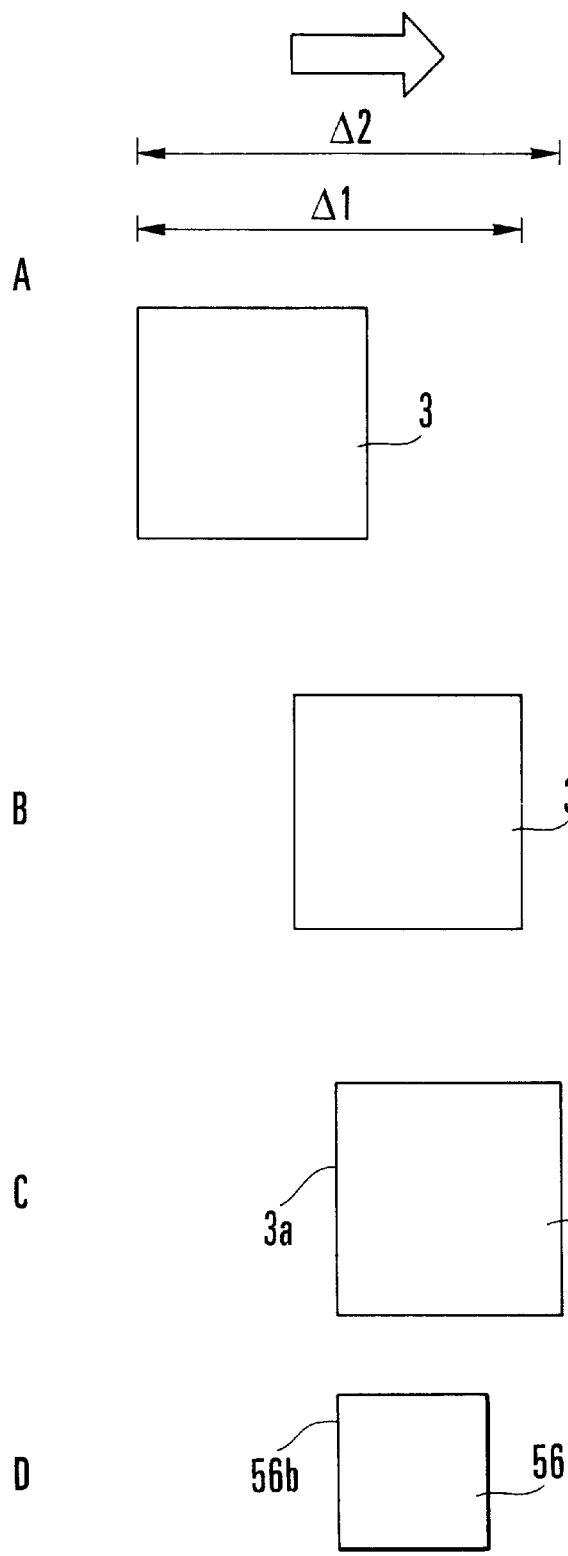
FIGS. 17(A through D) is a view showing the positional relationship between the perforation of a film and the engagement claw in the camera of FIG. 1.

FIG. 17 is a view showing the positional relationship between the perforation 3 of the film 2 and the engagement claw 56 with respect to the film feeding direction.

It is assumed here that, during winding, the film 2 travels toward the right as viewed in FIG. 17, as indicated by the shown arrow. A state "A" corresponds to the case in which when the motor 7 is stopped, the film 2 stops without overrunning. The perforation 3 is located on the leftmost side, as viewed in FIG. 17. A state "B" corresponds to the case in which when the motor 7 is stopped, the film 2 stops after overrunning to the greatest extent. Accordingly, the perforation 3 is located at any position within a range Δ1, depending on a variation in the stop position of the film 2.

A state "C" corresponds to the case in which the perforation 3 is located on the rightmost side which is allowable in terms of the positional relationship between the perforation 3 and each photographed frame. In this case, if the film 2 travels from the state "C" toward the right, a problem occurs, such as an overlap between adjacent frames.

From the above description, it is apparent that if the perforation 3 is located within a range Δ2, such a problem can be solved.

A state "D" shows the position of the engagement claw 56, and corresponds to the case in which the engagement portion 56b of the engagement claw 56 is located at the same position as the left end face 3a of the perforation 3 in the state "C".

FIG. 18 is a view showing the state in which the engagement claw 56 is inserted into the perforation 3 after the stop of the film 2. The respective positions of the perforation 3 in the states "A", "B" and "C" shown in FIG. 18 are the same as those of the perforation 3 in the states "A", "B" and "C" shown in FIG. 17. In the case of the state "A" of FIG. 18, a portion of the engagement claw 56 is superposed on the perforation 3, and the remaining portion of the engagement claw 56 is superposed on the film 2. In the case of the state "B", the engagement claw 56 is completely inserted in the perforation 3. Neither of the states "A" and "B" has a problem since the perforation 3 is located within the range Δ2, as described above with reference to FIG. 17. In the case of each of the states "A" and "B" or in the case of an intermediate state between the states "A" and "B", if a vibration is applied to the camera, the film 2 travels not in the film rewinding direction but in the film winding direction, i.e., toward the right on the sheet of FIG. 18, because the take-up spool 5 is engaged so that it does not rotate.

Then, the engagement portion 56b of the engagement claw 56 and the side 3a of the perforation 3 come into abutment with each other, so that the film 2 travels no further toward the right. This state is the state "C" shown in FIG. 18.

Incidentally, the state "C" shown in FIG. 18 has no problem since the perforation 3 is located within the range Δ2, as described above with reference to FIG. 17.

In the above-described manner, the engagement of the winding stopping lever 45 with the spool driving gear 19 and the engagement of the engagement claw 56 with the perforation 3 make it possible to prevent a vibration from causing the film 2 to travel in either of the film winding and rewinding directions.

Figure 13:
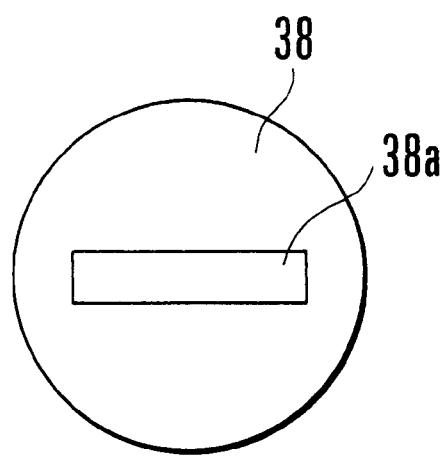
FIG. 13 is a bottom view of a driving gear of FIG. 1.

FIG. 13 is a view showing the driving gear 38, as viewed from below in FIG. 1. The driving gear 38 has a key groove 38a.

If the camera becomes inoperative by the consumption of a power-source battery or the like, a user inserts a key into the key groove 38a and rotates the driving gear 38, thereby manually rewinding the film 2. In this case, the film 2 travels toward the left as viewed in FIG. 12. At this time, although another side 3b of the perforation 3 comes into abutment with the inclined surface 56a of the engagement claw 56, the leaf spring 55 is deformed by a force acting on the inclined surface 56a because of the inclination thereof, so that the engagement claw 56 is retracted from the film 2 and the film 2 is rewound without coming into engagement with the engagement claw 56.

In addition, since the bent portion 45c of the winding stopping lever 45 is deformed, the toothed portion 45b is released from the engagement with the spool driving gear 19, so that the rotation of the take-up spool 5 becomes possible. Incidentally, the strength of deformation of the bent portion 45c is set to the strength at which the toothed portion 45b is not released from the engagement with the spool driving gear 19 by the application of a vibration and, while the film 2 is being rewound by an external force, the toothed portion 45b is released from such engagement.

Incidentally, the engagement cam 53, the head retracting cam 54 and the retracting lever 51 of the connecting shaft 50 as well as the winding stopping lever 45 are arranged so that, during the change-over from the state of FIG. 10 to the state of FIG. 11, operations (i), (ii) and (iii) can be performed in the following order:

(i) the toothed portion 45b of the winding stopping lever 45 engages with the spool driving gear 19 to prevent the motion thereof;

(ii) the engagement claw 56 engages with the film 2 to prevent the motion thereof; and (iii) the magnetic head 47 is retracted.

This arrangement provides the following effects.

(i) When the toothed portion 45b of the winding stopping lever 45 abuts on the spool driving gear 19, the spool driving gear 19 might be caused to rotate, thereby causing the film 2 to travel, depending on a relationship in phase between the toothed portion 45b and the spool driving gear 19. If in this instance, the engagement claw 56 has already engaged with the film 2, a problem arises in that an unnecessary force is applied to the film 2. This problem can be prevented by the above arrangement.

(ii) If the camera becomes inoperative by the consumption of battery power or the like when the magnetic head 47 is retracted in the state where the winding stopping lever 45 and the engagement claw 56 are released from their respective engagements, a problem arises in that the film 2 becomes free to allow the film 2 to travel by the application of a vibration or the like. This problem can be prevented by the above arrangement.

If the cam gear 18 is rotated from the state of FIG. 11 in the clockwise direction, the charging roller 41 rotates in the clockwise direction in accordance with the charging cam 18b, so that the charging lever 40 performs the above-described mirror-up operation. The end 44b of the rewinding lever 44 turns in the counterclockwise direction in accordance with the locus of the rewinding cam 18d. By the counterclockwise turn of the rewinding lever 44, the rewinding planetary arm 21 turns in the clockwise direction by the action of the return spring 70. In addition, the end 43a of the driving lever 43 rotates in the counterclockwise direction in accordance with the driving cam 18c. Accordingly, the projection 45a engages with the slot 43c of the driving lever 43 and the winding stopping lever 45 travels toward the left as viewed in FIG. 11, and the toothed portion 45b travels to a position where it is disengaged from the spool driving gear 19.

In the meantime, the retracting lever 51 and the connecting shaft 50 turn in the clockwise direction as viewed in FIG. 11 by the action of the return spring (not shown) and the abutment between the head retracting cam 54 and the abutment portion 48a of the head holder 48 is released, so that the magnetic head 47 is pressed against the pad 57 by the pressure spring (not shown). In addition, the engagement cam 53 comes into abutment with the leaf spring 55 and the engagement claw 56 is retracted from the perforation 3. When a mirror-up position is detected through the phase contact piece 18e and the phase circuit board 46 and the motor 7 is stopped, the state of FIG. 8 is obtained.

Figure 14:
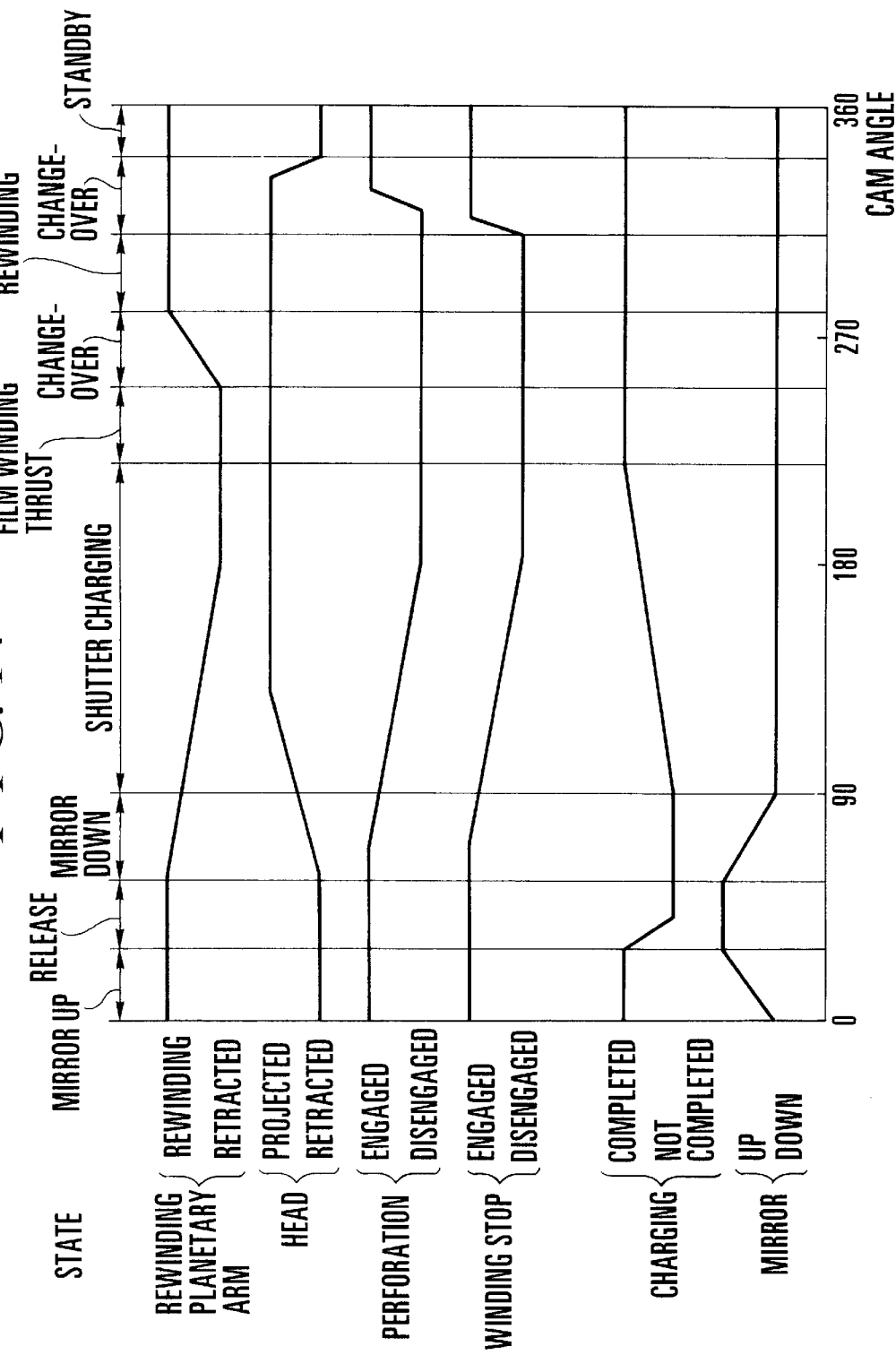
FIG. 14 is a graphic representation showing the operations of the camera and each cam of the cam gear of FIG. 3.

FIG. 14 is a graphic representation showing the above-described operation according to the cam diagram of FIG. 4.

Figure 15:
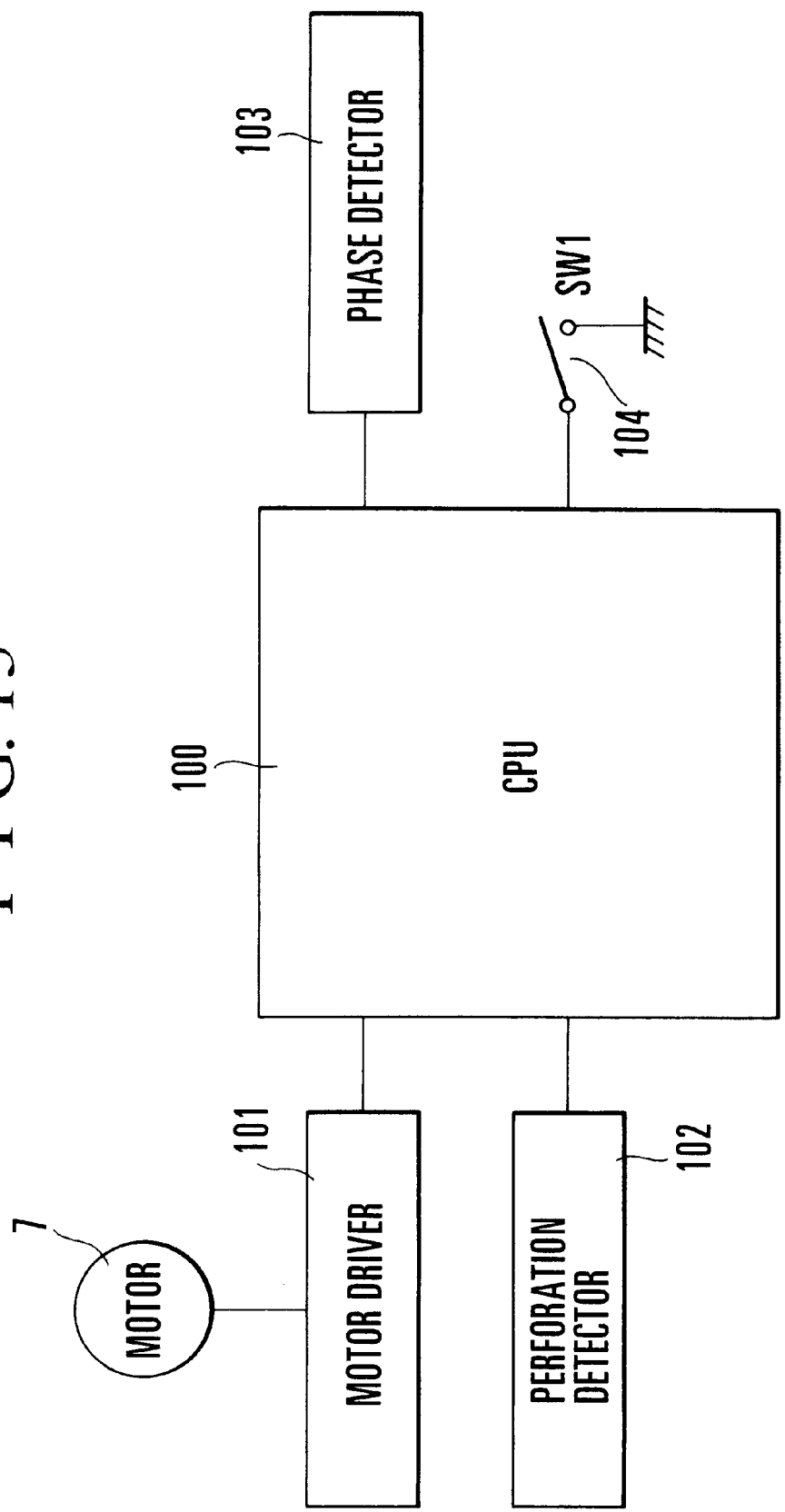
FIG. 15 is a block diagram of the electrical circuit of the camera of FIG. 1.

FIG. 15 is a block diagram showing a circuit for controlling the camera according to the present embodiment. The shown circuit includes a controlling microcomputer 100, a motor driver 101, and a phase detector 103 composed of the phase circuit board 46 and the phase contact piece 18e. The shown circuit also includes a first stroke switch (SW1) 104 which is turned on when a shutter release button (not shown) is depressed to a first stroke position, and a perforation detector 102 for detecting the perforation 3 of the film 2. The perforation detector 102 includes the optical sensor 4.

Incidentally, the film 2 accommodated in the film cartridge 1 to be loaded into the camera according to the present embodiment has two perforations per frame, and if the perforation detector 102 detects two perforations 3, it indicates that the film 2 is advanced by one frame.

Figure 16:
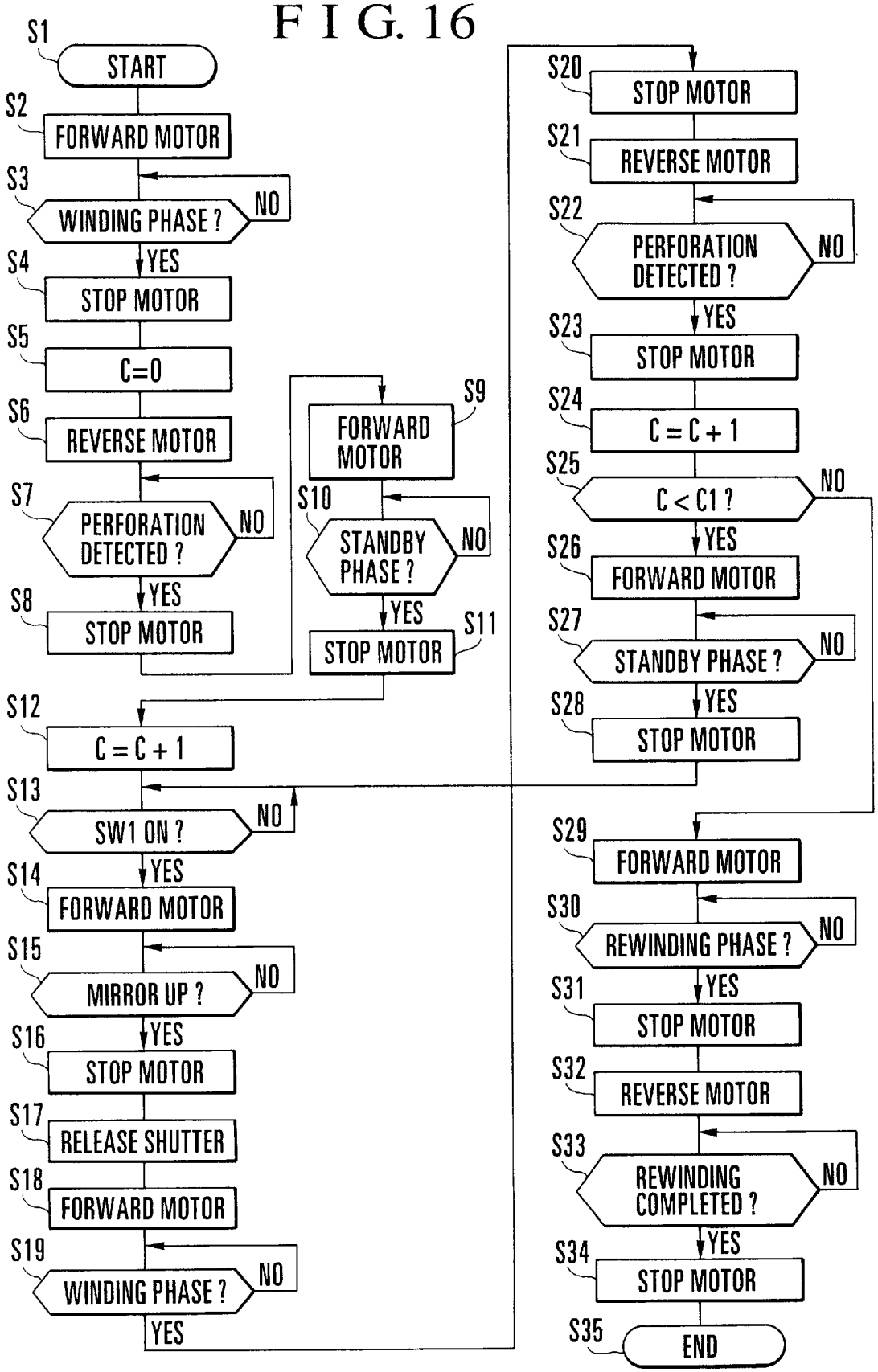
FIG. 16 is a flowchart of the operation of the controlling microcomputer shown in FIG. 15.

A series of operations of the camera according to the present embodiment will be described below with reference to FIG. 16 which shows a flowchart of the operation of the controlling microcomputer 100. In the following description, the respective rotations of the motor 7 in the clockwise and counterclockwise directions, as viewed from below in FIG. 1, will be referred to as "forward rotation" and "reverse rotation".

S1: The process is started. This sequence is started with the loading of the film cartridge 1 completed. Normally, at this time point, the phase of operation is the film rewinding phase.

S2: The motor 7 is driven in the forward direction by the motor driver 101. The motor 7 is driven forwardly, and the cam gear 18 is rotated to cause the film rewinding phase to change over to the film winding phase. Thus, the film spool of the film cartridge 1 rotates in the film winding direction, and film information is read from the bar code disk of the film cartridge 1.

S3: Whether the phase of operation is the film winding phase is detected by the phase detector 103. If the film winding phase is detected by the phase detector 103, the process proceeds to Step S4 for the purpose of automatic loading.

S4: The motor 7 is temporarily stopped to stop the rotation of the cam gear 18.

S5: A film counter C in the controlling microcomputer 100 is reset.

S6: The motor 7 is reversed by the motor driver 101. Since the phase of operation is the film winding phase shown in FIG. 9, the driving key 39 and the take-up spool 5 rotate, and the film 2 is fed out from the film cartridge 1 and is wound around the take-up spool 5. Thus, automatic loading is effected.

S7: The perforation 3 is detected by the perforation detector 102. If the perforation 3 is detected and the film 2 is advanced by one frame, the process proceeds to Step S8.

S8: The motor 7 is stopped to stop the travel of the film 2.

S9: The motor 7 is driven in the forward direction by the motor driver 101. The motor 7 is driven forwardly, and the cam gear 18 is rotated to cause the film winding phase to change over to the standby phase.

S10: Whether the phase of operation is the standby phase is detected by the phase detector 103. If the standby phase is detected by the phase detector 103, the process proceeds to Step S11.

S11: The motor 7 is temporarily stopped to stop the rotation of the cam gear 18. Since the phase of operation is the standby phase, the magnetic head 47 is retracted, and the winding stopping lever 45 and the engagement claw 56 are placed in engagement with the spool driving gear 19 and the film 2, respectively.

S12: The value of the film counter C is incremented by one.

S13: It is detected whether the first stroke switch (SW1) 104 is on. If the on state of the first stroke switch (SW1) 104 is detected, the process proceeds to Step S14, in which a shutter release operation is started.

S14: The motor 7 is driven in the forward direction by the motor driver 101. The motor 7 is driven forwardly and the cam gear 18 is rotated to perform a mirror-up operation.

S15: Whether the mirror-up operation has been performed is detected by the phase detector 103. If it is detected that the mirror-up operation has been performed, the process proceeds to Step S16.

S16: The motor 7 is stopped by the motor driver 101. The motor 7 is stopped to stop the rotation of the cam gear 18.

S17: The shutter release operation is performed. A shutter (not shown), a diaphragm and the like are operated to perform the shutter release operation.

S18: The motor 7 is driven in the forward direction by the motor driver 101. The motor 7 is driven forwardly to rotate the cam gear 18, and a mirror-down operation and a shutter charging operation are performed. While the mirror-down and shutter charging operations are being performed, the magnetic head 47 travels from a retraction position to a projection position for recording or reading information on or from the film 2 and the winding stopping lever 45 and the engagement claw 56 are released from the engagements with the spool driving gear 19 and the film 2, respectively.

S19: Whether the phase of operation is the film winding phase is detected by the phase detector 103. If the film winding phase is detected by the phase detector 103, the process proceeds to S20.

S20: The motor 7 is stopped. The motor 7 is stopped to stop the rotation of the cam gear 18.

S21: The motor 7 is driven in the reverse direction by the motor driver 101. Since the phase of operation is the film winding phase shown in FIG. 9, a film winding operation is performed by the take-up spool 5.

S22: The perforation 3 is detected by the perforation detector 102. If the perforation 3 is detected and the film 2 is advanced by one frame, the process proceeds to Step S23.

S23: The motor 7 is stopped to stop the travel of the film 2.

S24: The value of the film counter C is incremented by one.

S25: It is determined whether the value of the film counter C is smaller than a predetermined value C1. If C<C1, the process proceeds to Step S26. If it is not determined that C<C1, it is determined that all the frames have been photographed, and the process proceeds to Step S29.

S26: The motor 7 is driven in the forward direction by the motor driver 101. The motor 7 is driven forwardly, and the cam gear 18 is rotated to cause the film winding phase to change over to the standby phase.

S27: Whether the phase of operation is the standby phase is detected by the phase detector 103. If the standby phase is detected, the process proceeds to Step S28.

S28: The motor 7 is stopped to stop the rotation of the cam gear 18. Since the phase of operation is the standby phase, the process returns to Step S13 in which the magnetic head 47 is retracted and the winding stopping lever 45 and the engagement claw 56 are respectively placed in engagement with the spool driving gear 19 and the film 2. In Step S13, the process waits for a shutter release operation to be performed.

S29: The motor 7 is driven in the forward direction by the motor driver 101. The motor 7 is driven forwardly, and the cam gear 18 is rotated to cause the film winding phase to change over to the film rewinding phase.

S30: Whether the phase of operation is the film rewinding phase is detected by the phase detector 103. If the film rewinding phase is detected, the process proceeds to Step S31.

S31: The motor 7 is stopped to stop the rotation of the cam gear 18.

S32: The motor 7 is driven in the reverse direction by the motor driver 101. Since the phase of operation is the film rewinding phase shown in FIG. 10, when the motor 7 is reversed, the driving key 39 is rotated and the film 2 is rewound into the film cartridge 1.

S33: Whether the film rewinding operation has been completed is detected through the perforation detector 102. If it is detected by a known method using the perforation detector 102 that the film 2 has been completely rewound into the film cartridge 1, the process proceeds to Step S34.

S34: The motor 7 is stopped to stop the film rewinding operation.

S35: The above series of operations are ended.

Incidentally, although in the above-described embodiments the magnetic head 47 is moved backward and forward, the present invention can be applied to an arrangement in which the pad 57 is moved backward and forward.

In addition, although in the above-described embodiments the take-up spool is engaged, the present invention can be applied to an arrangement in which another film transport device, such as a sprocket, is engaged.

Although in the above-described embodiments the perforation of the film is engaged, the present invention can be applied to an arrangement in which another portion of the film is engaged.

In addition, the present invention can also be applied to an apparatus in which an arrangement for recording or reading information on or from the film is a magnetic head having a structure different from that of the magnetic head employed in the above-described embodiments, or is an element other than the magnetic one, such as an electronic element or an optical element.

Further, in the above-described embodiments, since the camera is of the type which performs photography each time the film is wound up by one frame, the film is tightly wound around the film take-up spool of the camera. Therefore, by engaging the film take-up spool of the camera, the film is prevented from travelling in the film rewinding direction. If such an arrangement that the film is tightly wound around the film supply spool of the film cartridge is adopted, the film may be prevented from travelling in the film winding direction, by engaging the film supply spool of the film cartridge. In particular, in a camera of the so-called prewind type which performs photography each time the film is rewound by one frame, since, usually, the film is tightly wound around the film supply spool of the film cartridge, the film can be prevented from travelling in the film winding direction, by engaging the film supply spool of the film cartridge. In addition, if such an arrangement that the film is tightly wound around both the film take-up spool of the camera and the film supply spool of the film cartridge simultaneously, the film can also be prevented from travelling in either of the film winding and rewinding directions, by engaging both the film take-up spool of the camera and the film supply spool of the film cartridge.

Further, an arrangement for allowing the film to be rewound into the film cartridge in case of emergency is not limited to the engagement claw (56) used in the above-described embodiments, and may be any arrangement capable of retracting an engagement claw by a force applied from outside the camera.

Incidentally, the software arrangement and the hardware arrangement of each of the above-described embodiments may be replaced, as required.

The present invention can also be applied to a film cartridge of the type which differs from the film cartridge used in the above-described embodiments, or a cartridge having an image recording medium other than a film.

The present invention can also be applied to any type of system capable of recording or reading information on or from a film.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be carried out by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical apparatuses other than such cameras, apparatuses other than the optical apparatuses, apparatuses applied to the cameras or the optical or other apparatuses, or elements which constitute part of such apparatuses.

What is claimed is:

1. A camera comprising:

(A) a first device which prevents a film from travelling when a film transport device is placed in a stopped state by engaging the film, the film transport device including a motor which generates a driving power for a transport operation;

(B) a second device which prevents the film from travelling when the film transport device is placed in a stopped state by engaging the film transport device; and (C) a change-over device which changes over the first device into an operation state for preventing film movement, a release operation state which does not prevent the film movement, and the change-over device performing a change-over operation by using the driving power generated by the motor for the transport operation.

2. A camera according to claim 1, wherein said first device includes a member which engages with a perforation of the film.

3. A camera according to claim 2, wherein said second device includes a member which operates on a film take-up spool of said camera.

4. A camera according to claim 1, wherein said second device includes a member which operates on a film take-up spool of said camera.

5. A camera according to claim 2, wherein said member which engages with the perforation of the film has an inclined surface which allows the film to travel in a film rewinding direction.

6. A camera comprising:

(A) first means for preventing a film from travelling when a film transport device is placed in a stopped state by engaging the film, the film transport device including a motor which generates a driving power for a transport operation;

(B) second means for preventing the film from travelling when the film transport device is placed in a stopped state by engaging the film transport device; and (C) a change-over device which chances over the first means into an operation state for preventing film movement, a release operation state which does not prevent the film movement and the change-over device performing a change-over operation by using the driving power generated by the motor for the transport operation.

* * * * *

UNITED STATES PATENT AND TRADEMARK OFFICE
CERTIFICATE OF CORRECTION

PATENT NO. : 6,049,678  
DATED : April 11, 2000  
INVENTOR(S) : Tetsuya Nishio

Page 1 of 1

It is certified that error appears in the above-identified patent and that said Letters Patent is hereby corrected as shown below:

Title page,
After Item [22], insert -- [30] Foreign Application Priority Data
Jun. 1, 1995     [JP]     Japan ......................... 7-135468
Jun. 1, 1995     [JP]     Japan ......................... 7-135469

Signed and Sealed this

Twenty-fifth Day of December, 2001

Attest:

Attesting Officer

JAMES E. ROGAN
Director of the United States Patent and Trademark Office